US 6,581,891 B1

(12) United States Patent
Byrd

(10) Patent No.: US 6,581,891 B1
(45) Date of Patent: Jun. 24, 2003

(54) APPARATUS FOR SUPPORTING BIRDHOUSES, FEEDERS AND THE LIKE FROM DIFFERENTIATED MEMBERS

(76) Inventor: David A. Byrd, 5889 N. 700 W., Craigville, IN (US) 46731

( * ) Notice: Subject to any disclaimer, the term of this patent is extended or adjusted under 35 U.S.C. 154(b) by 0 days.

(21) Appl. No.: 09/896,554

(22) Filed: Jun. 29, 2001

Related U.S. Application Data
(60) Provisional application No. 60/216,566, filed on Jul. 7, 2000.

(51) Int. Cl.$^7$ ............................................ A47B 5/00
(52) U.S. Cl. ........................ 248/219.4; 248/218.4; 248/219.3; 248/228.8; 248/235; 248/240; 248/230.8
(58) Field of Search ..................... 248/218.4, 219.1, 248/219.3, 228.8, 235, 240, 230.8, 219.4; 211/90.02, 90.01, 116, 169.1, 119.01

(56) References Cited

U.S. PATENT DOCUMENTS

| | | | |
|---|---|---|---|
| 859,454 A | * 7/1907 | Larsson | 108/134 |
| 1,535,978 A | * 4/1925 | Baker | 182/187 |
| 3,136,519 A | * 6/1964 | Spriggle | 248/230.8 |
| 3,345,028 A | 10/1967 | Lawrie | |
| 3,612,460 A | * 10/1971 | Smith | 248/230.9 |
| 3,695,569 A | * 10/1972 | Pullan | 248/235 |
| 3,785,604 A | 1/1974 | Steck | |
| D325,838 S | * 5/1992 | Lamprey | D6/574 |
| 5,117,779 A | * 6/1992 | Karow | 119/69.5 |
| 5,263,675 A | * 11/1993 | Roberts et al. | 182/142 |
| 5,310,151 A | 5/1994 | Engel | |
| 5,335,889 A | * 8/1994 | Hopkins et al. | 248/219.4 |
| D384,879 S | * 10/1997 | Carlson | D8/381 |
| 5,865,410 A | * 2/1999 | Horen | 182/82 |
| 6,065,722 A | 5/2000 | LeVassseur et al. | |
| 6,202,964 B1 | * 3/2001 | Thornhill | 248/219.4 |
| 6,224,029 B1 | * 5/2001 | Marble et al. | 248/214 |
| 6,338,212 B1 | * 1/2002 | Santa Cruz et al. | 40/607 |

* cited by examiner

Primary Examiner—Leslie A. Braun
Assistant Examiner—Ingrid Weinhold
(74) Attorney, Agent, or Firm—O'Malley and Firestone

(57) ABSTRACT

According to the invention there is provided a system for supporting fixtures such as birdhouses, lanterns and feeders from differentiated supports. The apparatus includes a mounting board having front and back major surfaces. At least a first and preferably first and second horizontal rows of a plurality of slots pass through the backplane member from the back to the front major surfaces. A retainer strap is fitted through a pair of slots in each row and is closable to form a circuit, which may be sized to fit around a post, branch or trunk abutting the back major surface of the backplane. A support is pivotally attached to the front major surface and is positionable to provide a ledge.

13 Claims, 6 Drawing Sheets

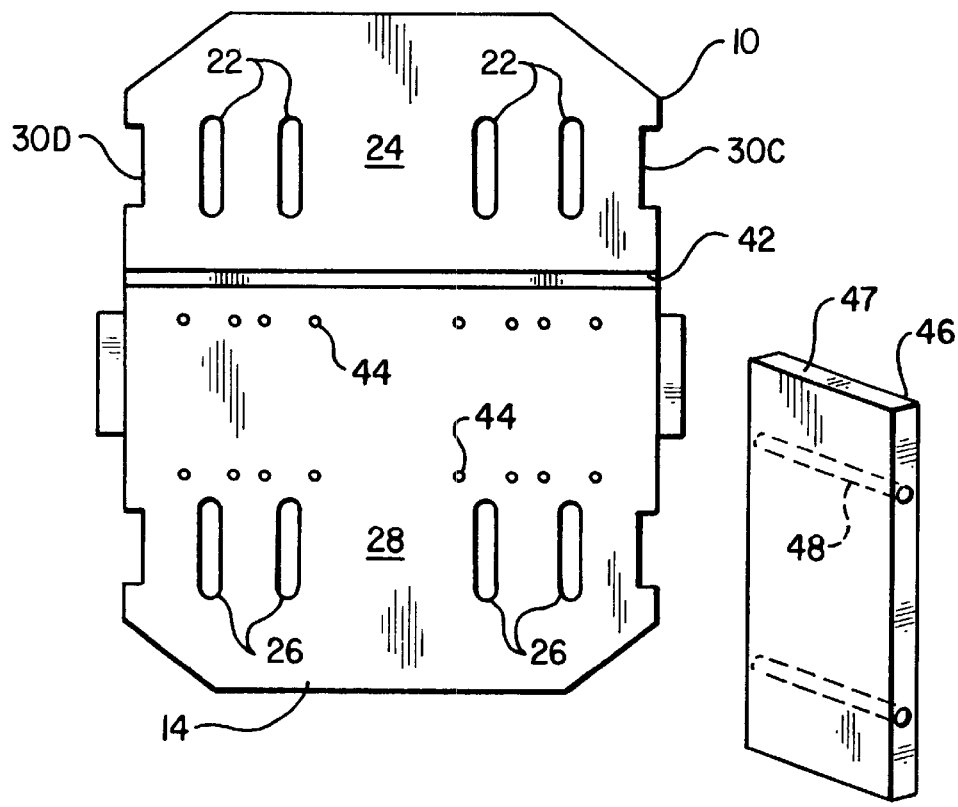
FIG. 2
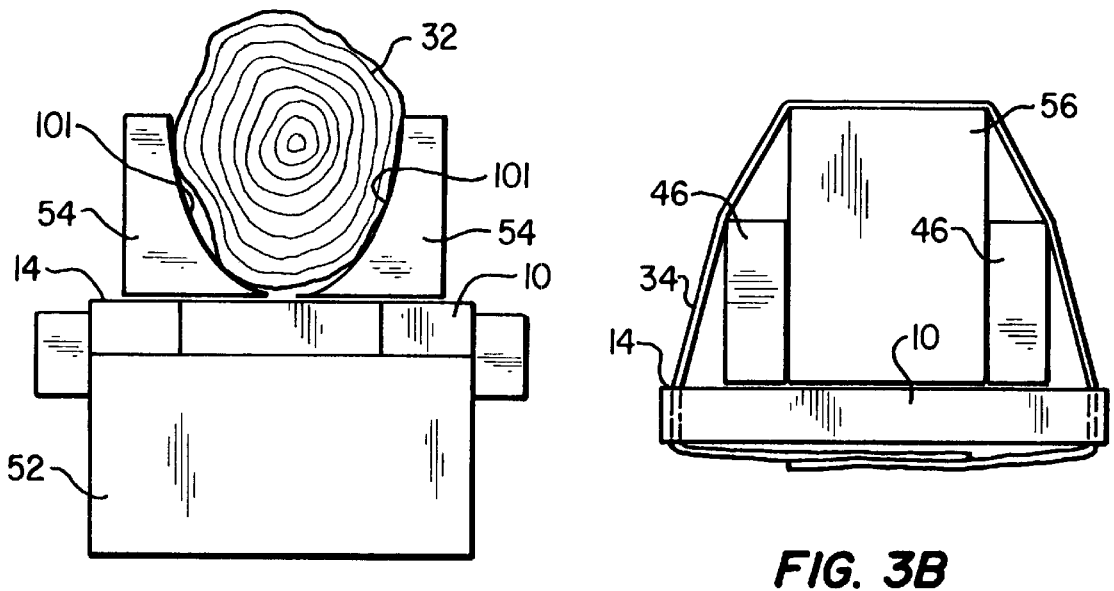
FIG. 3A　　　FIG. 3B

APPARATUS FOR SUPPORTING BIRDHOUSES, FEEDERS AND THE LIKE FROM DIFFERENTIATED MEMBERS

REFERENCE TO RELATED APPLICATION

The application claims priority to provisional application Serial No. 60/216,566 filed Jul. 7, 2000.

BACKGROUND OF THE INVENTION

1. Field of the Invention

The present invention relates to positionable outdoor supports for birdhouses, bird feeders, lanterns and similar articles, and particularly to an outdoor support temporarily mountable on posts or trees of diverse shapes without penetration of or damage to the post or tree.

2. Description of the Problem

It is often convenient to use an existing tree or pole as a support for a fixture such as camp lantern, a birdhouse, a feeding station, or similar object. All too often, such fixtures have been mounted to a tree or wooden post by hammering a nail into the tree to provide a hook or support point. A nail can penetrate the bark of a tree and damage the tree by providing a point of attack against the tree for insects. Additionally, where used as a temporary support for items such as lanterns, they can pose a dangerous protrusion on which people can be injured. Temporarily mounted birdfeeders have proven a particular problem in campgrounds. A single tree may have nails hammered into it several times a season as different campers hang feeders and either ignore or miss previously installed nails.

The art has proposed mounting methods for lanterns and other objects which include belts wrapped around objects such as trees thereby avoiding the use of nails. The prior art illustrates positioning of a support against a substantially vertical section of a tree. The favorable positioning of a birdhouse or feeder for viewing of the animals attracted by the structure, while maintaining an aesthetically pleasing regular orientation of the supported fixtures would be aided by the ability to use branches which may grow in any one of many directions from a tree trunk.

SUMMARY OF THE INVENTION

According to the invention there is provided an apparatus for supporting fixtures from limbs, poles, tree trunks and the like. The apparatus includes a backplane member having front and back major surfaces. At least a first and preferably first and second horizontal rows of a plurality of slots pass through the backplane member from the back to the front major surfaces. A retainer strap is fitted through a pair of slots in each row and is closable to form a circuit, which may be sized to fit around a post, branch or trunk abutting the back major surface of the backplane.

Positionable backplane braces may extend from the back major surface of the backplane to provide horizontal bracing for the system on the post, branch or tree. A fixture support element depends from the front major surface of the backplane member. The fixture support element may include a stationary member, having a major, upward oriented support surface. Alternatively, a support member may be provided which is positionable about a horizontally oriented pivot, such as a hinge. The rotational position of the support member on the hinge may then be fixed by adjustment of a positioning element, such as a strap, a positionable brace, a press in clip holder, adjustable angle brackets, and the like.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is an exploded view of the support.

FIGS. 3A–B are cross-sectional views of the support illustrated in FIGS. 1 and 2 including optional bracing.

DETAILED DESCRIPTION OF THE INVENTION

Figure 1B:
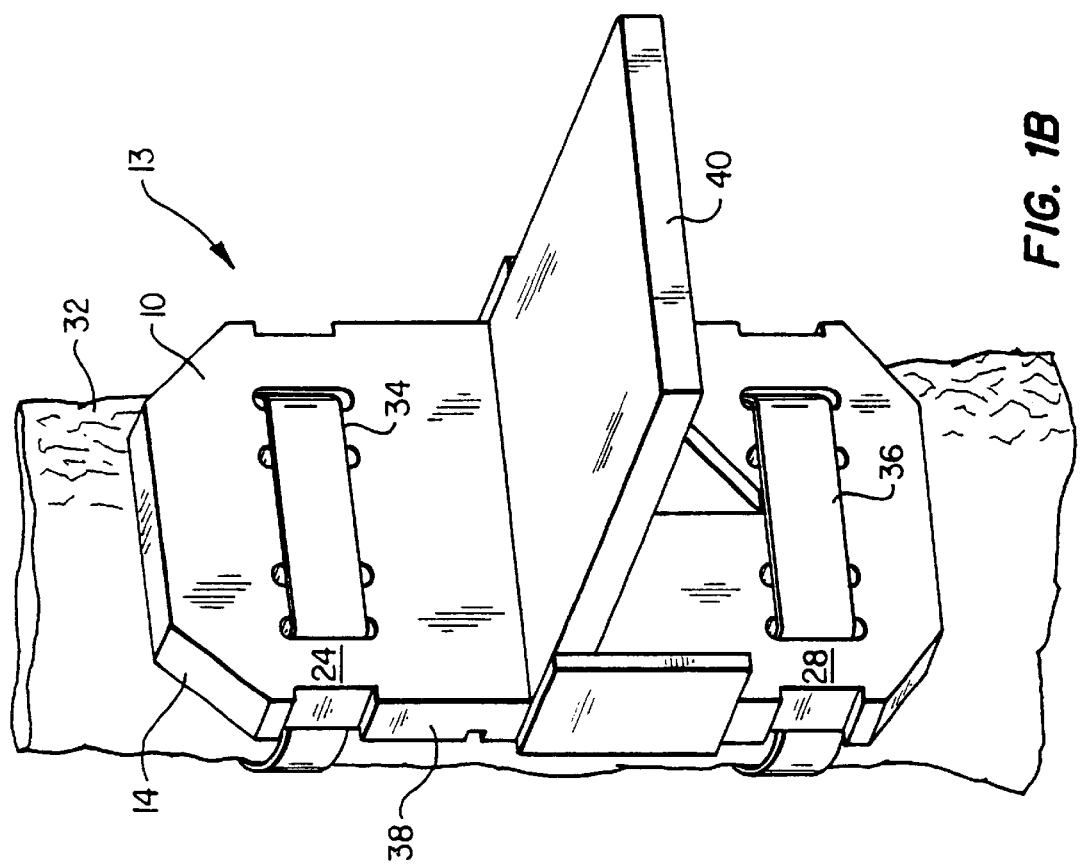
FIGS. 1A–1B are perspective views of the mounting board base of the present invention.
Figure 1A:
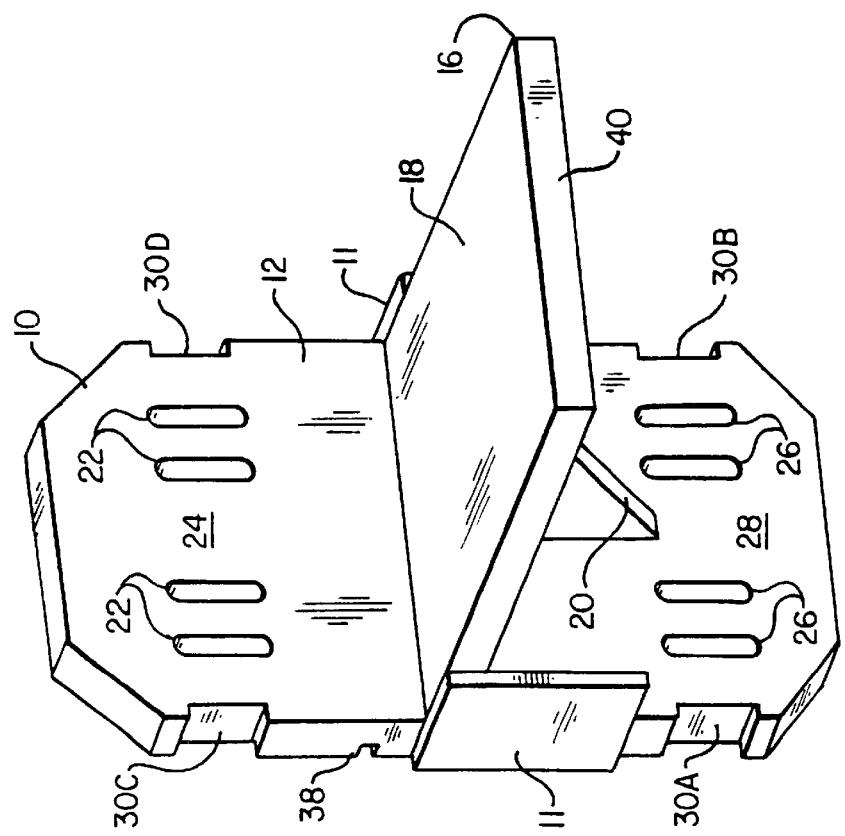

Referring now to FIGS. 1A–1B, an apparatus for supporting a birdhouse, birdfeeder, lantern or other fixture is illustrated. The apparatus includes a backplane or mounting board 10. Mounting board 10 is formed from a flat plank and has two major opposed surfaces, including a front major surface 12 and a back major surface 14 (shown in FIG. 2). Mounting board 10 is intended to be positioned along its back major surface against a tree, post, pole, or branch. Mounting board 10 is retained against a generally upright member by belts (shown in FIG. 1B) which are fitted around notches 30A–D or through pairs of slots 22 and 26 in horizontal rows of slots 24 and 28, respectively. The orientation of rows 24 and 28 define a preferred upright orientation of mounting board 10 perpendicular to the rows and, usually, parallel to the mounting board and allow selection of two out the four or more slots in each row to best fit the diameter of the support. However, as discussed below, mounting board 10 may be positioned on an upright, but incompletely vertical member and still support a fixture in a generally level state on shelf 16. Slots 22 and 26 pass through mounting board 10 from the front major surface 12 to the back major surface 14 allowing a retaining belt to be threaded through the board. Alternatively, a belt may be wound around the board using pairs of notches 30C–D or 30A–B which are cut into the border edge 38 and which serve as an alternative form of slot for retaining a belt in position.

Shelf 16 extends forward from front major surface 12. Shelf 16 may be attached to and supported from mounting board 10 in a number of different ways to bring the upper surface 18 thereof level. As illustrated in the instant figure shelf 16 is supported along its edge 40 by side supports 11 which are also attached to edge 38 of mounting board 10. Shelf 16 is also supported from below by a brace 20, which may take a number of different forms, preferred embodiments of which are discussed below. The upper major surface 18 of the shelf 16 is intended to lie horizontally in use and may provide a place of support for a fixture such as a birdhouse or feeder (not shown).

FIG. 1B illustrates use of the apparatus 13 of the present invention on a tree trunk 32. The back major surface 14 (shown in FIG. 2) of the mounting board 10 abuts the tree trunk and belts 34 and 36, which have been threaded through pairs of slots in the upper and lower rows of slots, 24 and 28, respectively, are wrapped around the trunk. The belts include cooperating hook and loop fastening sections on opposed ends and surfaces of the belts which may be pressed together to temporarily hold the mounting board against the tree trunk. Belts 34 and 36 are fabricated from nylon, or another suitably weather resistant, flexible material.

FIG. 2 illustrates the back major surface 14 of mounting board 10, which is intended to be brought into contact with an external, generally upright member for support. Depending upon the application of the apparatus of the invention, additional bracketing extending from mounting board 10 and partially embracing the upright member may be desired. Accordingly, the back major surface 14 may be prepared to receive bracing. Among these features are an alignment slot 42 running horizontally across the surface 14. A plurality of starter holes 44 are disposed in two spaced, horizontal rows parallel to the alignment slots. Alignment slot 42 and holes 44 are between rows 24 and 28 of slots 22 and 26. A brace block 46 may be attached to the back major surface 14 by introduction of screws through holes 48 which pass from edge to opposed edge of the block. Block 46 is placed against back major face 14, with the top edge 47 aligned with alignment notch 42, and centered over a vertically aligned pair of starter holes 44. Screws 50 may then be introduced through the block 46 to fix its position. With two belts weights of up to 35 kilograms (about 75 lbs.) may be supported. Mounting board 10 is preferably made of a durable wood such as red cedar or of plastic. If board 10 is plastic, plastic may also be used for screws 50.

FIGS. 3A and B are cross sectional views taken from below, and illustrate positioning of the apparatus of the present invention onto a tree trunk 32 or a post 56. Brace blocks 54 may be conformed to the member being used as a support, or the simple rectangular blocks provided by brace block 46 may be used. Brace blocks of either type may be particularly useful where the apparatus is used to support a fixture subject to substantial horizontal loading, such as a flag on a windy day. Vertically oriented braces 54 and 46 are disposed against the rear major surface 14 of the mounting board 10 and are spaced to abut sides of the member to which the apparatus is mounted. The braces 54 or 46 are fixed to the mounting board 10 by screws which pass through the braces into the mounting board. Braces 46 has inner surfaces facing the tree trunk 32 which are curved to conform partially to the shape of the tree trunk. Plane inner surfaces of brace blocks 46 will snugly fit against a post which has flat exterior surfaces. Retaining belt 34 is fitted around the post 56, illustrating closure around the post. Vertical support of the apparatus is effected by the friction between the post, the belt 34, the brace blocks 46 and the back major surface 14.

Figure 4:
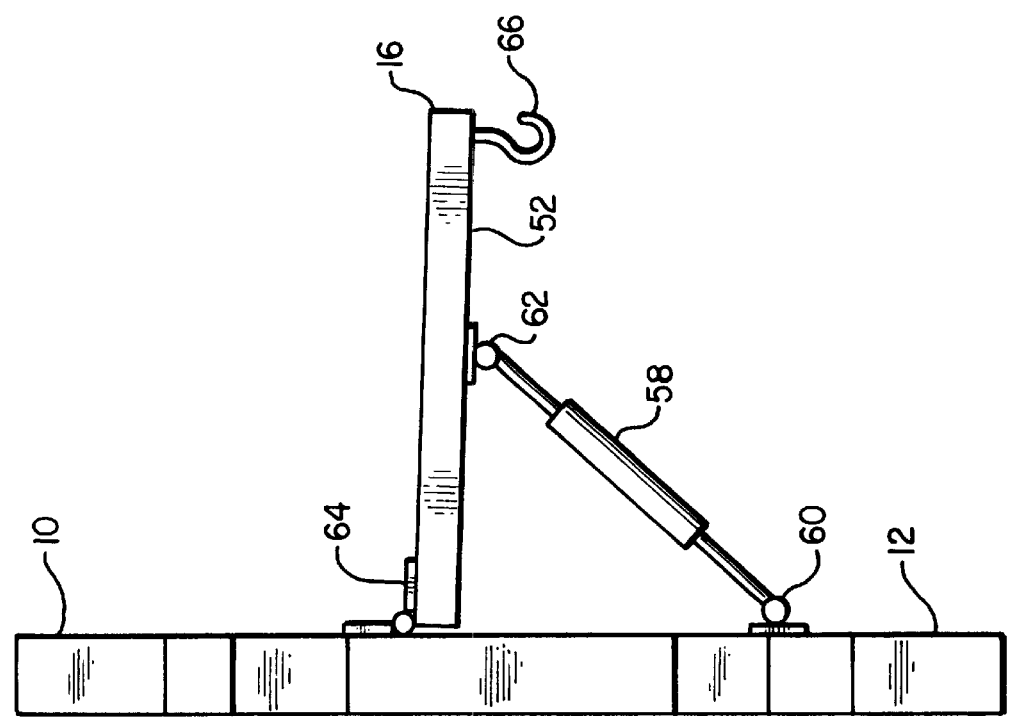
FIG. 4 is a side elevation of one embodiment of the support system.

FIGS. 4–8 illustrate several embodiments of positionable support for shelf 16. Shelf 16 extends forward from the front major face 12 of mounting board 10. Each embodiment permits positioning shelf 16 at diverse angles relative front face 12 to provide an horizontal surface. Alternatively, the shelf 16 may positioned at a non-perpendicular angle relative to the ground if being used to support a flag or if a lantern is being hung from the shelf. In FIG. 4 shelf 16 is attached to front major surface 12 by a hinge 64 which is mounted between the front major surface and the lower major surface 52 of the shelf 16. Hinge 64 is oriented to have its axis of rotation parallel to the front major surface 12 and perpendicular to the preferred upright orientation of the mounting board 10. Shelf 16 is positionable by rotating the shelf on hinge 64 and the selected position fixed by an adjustable strut/turn buckle 58. Adjustable strut/turn buckle 58 is attached at its respective ends to the front major surface 12 and the lower major surface 52 by pivots joints 60 and 62 respectively. A hook, from which items such as lanterns may be suspended extends downwardly from shelf 16.

Figure 5:
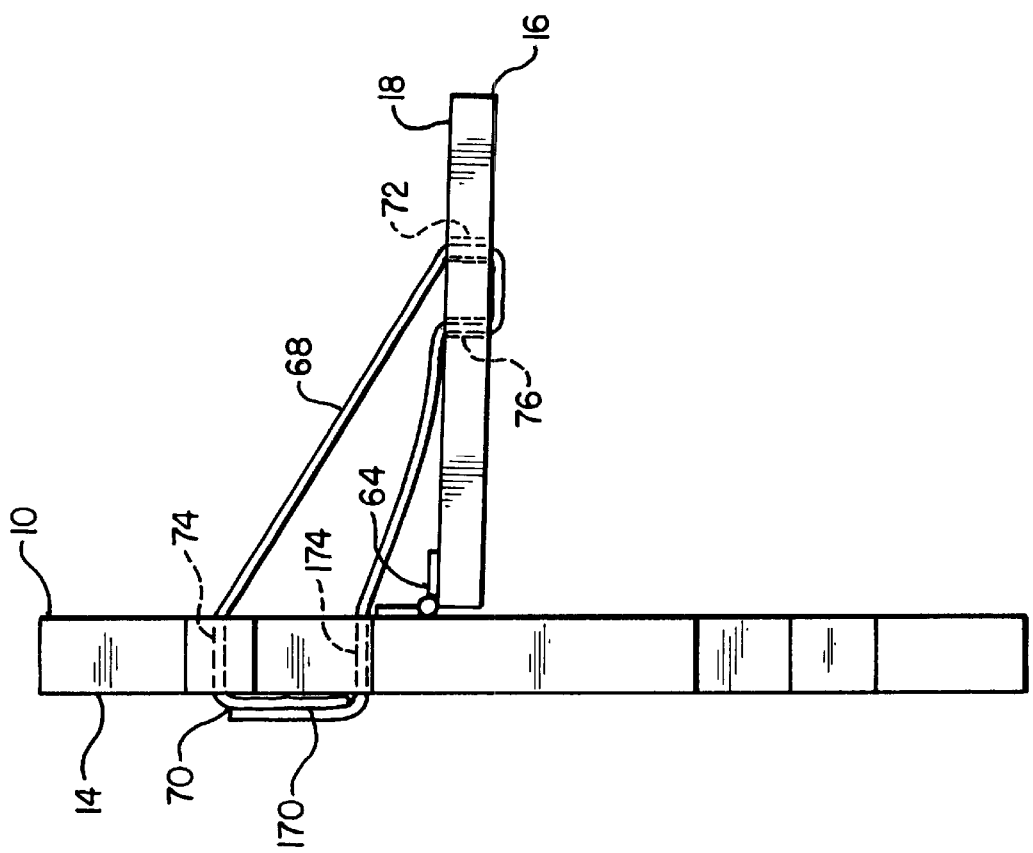
FIG. 5 is a side elevation of another embodiment of the support system.

In FIG. 5 suspension of the shelf 16 is provided by a strap 68 extending from behind mounting board 10, through a slot 74 in the mounting board and forward to the upper surface 18 of shelf 16. Strap 68 extends through shelf 16 via a slot 72, turns back on itself under shelf 16 and returns to the upper surface 18 of the shelf through slot 76. Strap 68 then extends from slot 76 to a slot 174 through mounting board 10 to the back major surface 14 of the board. The ends of strap 68 have opposed cooperating hook and loop surfaces 70 and 170, allowing the strap to be closed on itself securing shelf 16's position.

Figure 6:
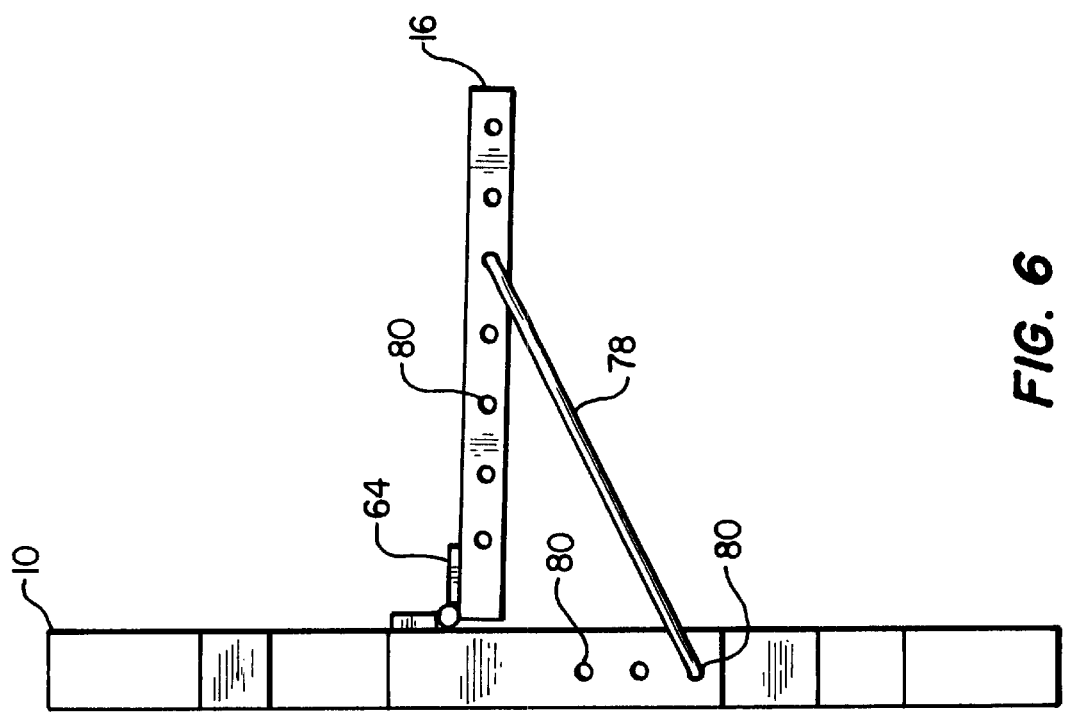
FIG. 6 is a side elevation of yet another embodiment of the support system.

In FIG. 6 shelf 16 is pivotable on a hinge 64 and is positionally locked by a pair of C shaped braces 78 which may be inserted into holes 80 drilled into the edges of the mounting board 10 and the shelf 16.

Figure 7:
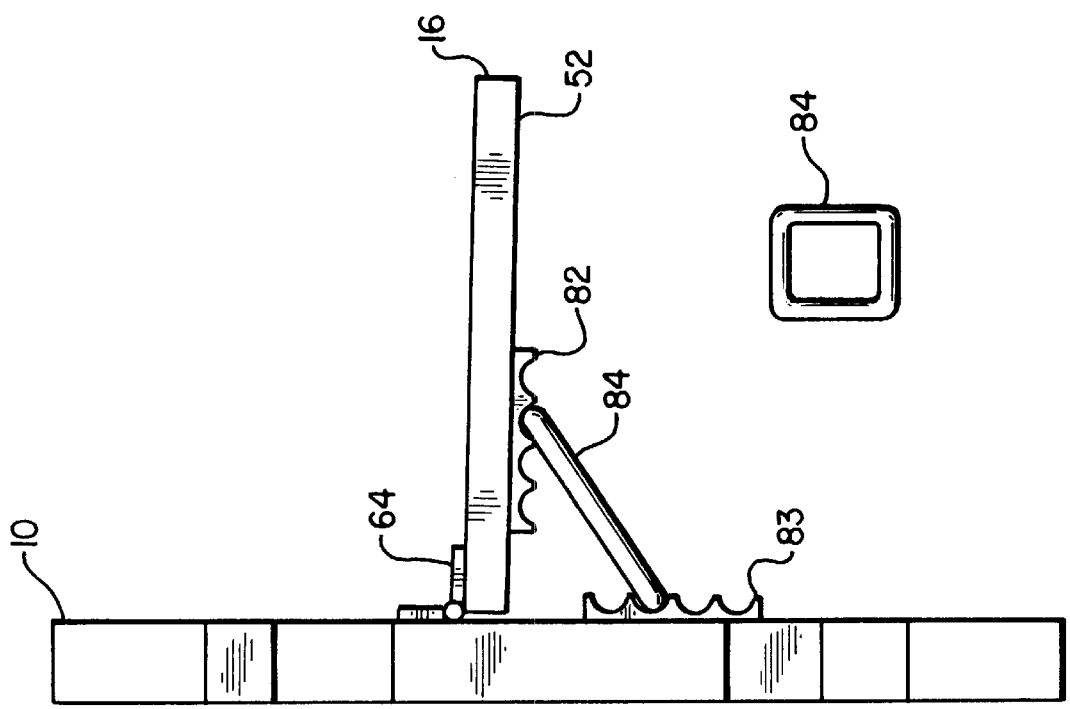
FIG. 7 is a side elevation of still another embodiment of the support system.

In FIG. 7 shelf 16 has a grooved plate 82 adhering the lower major surface 52. A second grooved plate 83 is positioned on the front major surface 12 below shelf 16 and aligned with grooved plate 82. A press in rectangular clip 84 may be inserted between plates 82 and 83 to lock the position of shelf 16. Press in clip 84 may be supplied in different sizes to support different angles of support for the support member.

Figure 8:
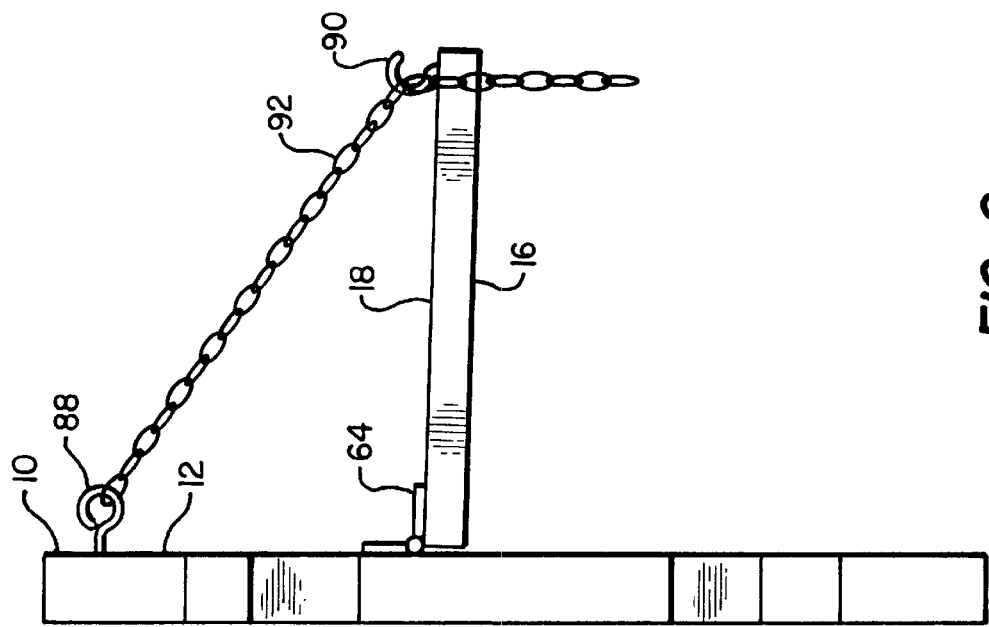
FIG. 8 is a side elevation of another embodiment of the support system.

In FIG. 8 shelf 16 is supported by a linked chain 92 which is attached at one end to a hook 88 positioned on the mounting board 10 above shelf 16 and extending forward from front major surface 12. The chain 92 extends from hook 88 to an open hook 90 mounted in shelf 16 at the end distal to hinge 64 and extending upwardly from upper major surface 18.

Figure 9:
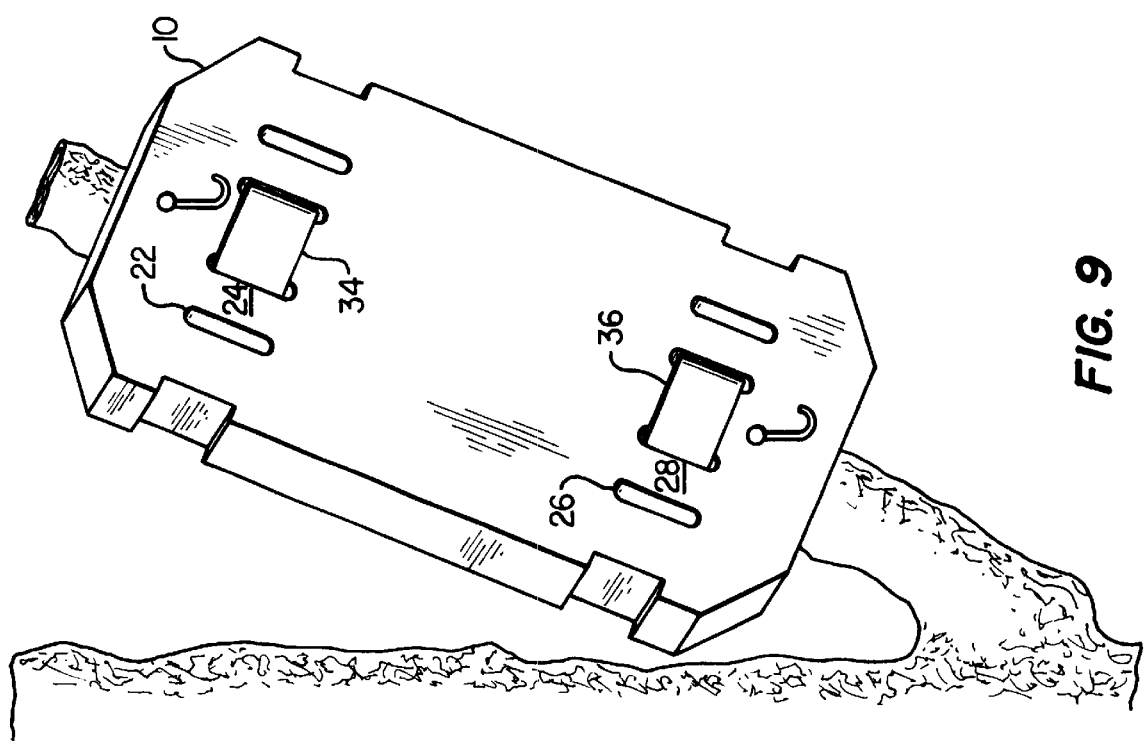
FIG. 9 is a perspective view of the mounting board portion of the support system mounted on an angled tree branch.

FIG. 9 illustrates a mounting board 10 positioned on an incompletely vertical branch.

Figure 10:
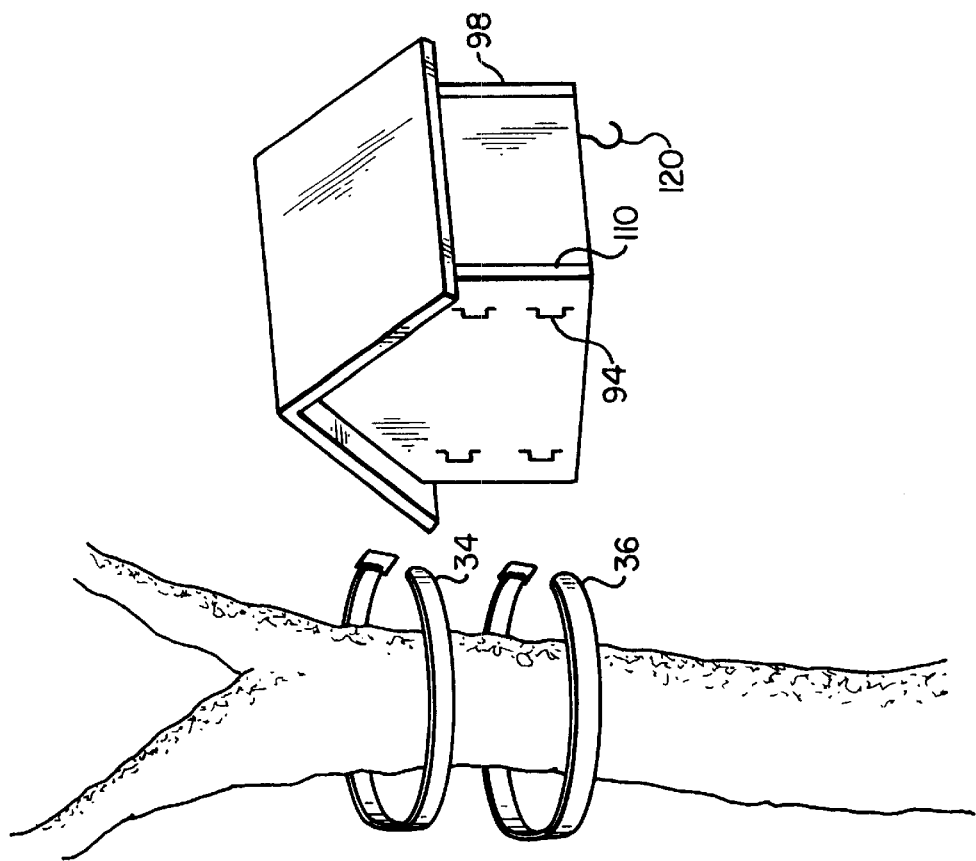
FIG. 10 illustrates another embodiment of the mounting board of the invention wherein slots for fitting supporting belts are provided by c-shaped hooks affixed to the rear major surface of a mounting board.

FIG. 10 illustrates installation of a mounting board 110 as a back wall of a birdhouse 98. Brackets 94 attached to the back of the birdhouse substitute for notches or slots to allow attachment of retaining belts 34 and 36, which here loop the tree and the brackets, rather than the whole backplane. A hook 120 attached to the birdhouse floor allows items such as thermometers to be hung from the object.

Figure 11:
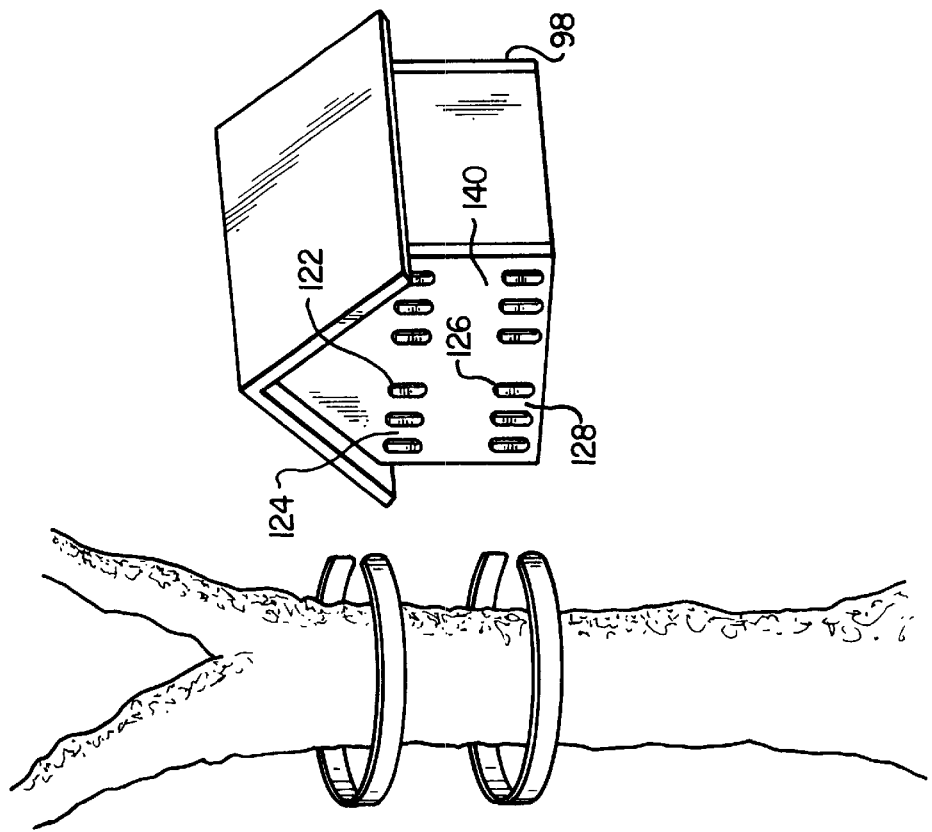
FIG. 11 illustrates another embodiment of the mounting board of the invention wherein slots for fitting supporting belts are provided by rows of slots cut through the mounting board.

FIG. 11 illustrates a mounting board 140 of the preferred embodiment of the invention employed as the backwall to a birdhouse 98. Adjustable braces (not shown) may be added to the backplane. A side of the birdhouse may be hinged to allow access to the interior of the house easing threading of the belts through pairs of slots 122 or 126 in each row 124 and 128 of slots through the board 140.

While the invention is shown in only a few of its forms, it is not thus limited but is susceptible to various changes and modifications without departing from the spirit and scope of the invention.

What is claimed is:

1. Apparatus comprising:
   a mounting board having a flat front major surface and a flat back major surface;
   a plurality of slots arranged in at least a first row with respect to the mounting board, the plurality of slots comprising a number of slots greater than two, allowing the user to select a pair of slots best spaced to fit an external support;
   a belt fitted through at least two slots in the first row and extending outwardly from the flat back major surface;
   a shelf having a flat upper major surface and a lower major surface and extending outwardly from the flat front major surface;
   a hinge oriented with its axis of rotation parallel to the first row of slots attaching the mounting board to the shelf; and
   a restraint removably positioned between the shelf and the mounting board for limiting rotation of the support on the mounting board.

2. The apparatus of claim 1, further comprising:
   a plurality of slots arranged in a second row with respect to the mounting board; and
   a second belt fitted through at least two slots in the second row and extending outwardly from the flat back major surface.

3. The apparatus of claim 1, wherein the first row of slots pass through the mounting board from the flat front major surface to the flat back major surface.

4. The apparatus of claim 2, wherein the first and second rows of slots pass through the mounting board from the flat front major surface to the flat back major surface and the first and second rows of slots comprise more than two slots with the belt and the second belt looped through a selected pair of slots in each of the respective rows to best fit the diameter of an external support.

5. The apparatus of claim 4, wherein the restraint further comprises a brace positionable between the lower major surface of the shelf and the flat front major surface of the mounting board.

6. The apparatus of claim 4, wherein the restraint further comprises positioning rods fitted to outer edges of the mounting board and the shelf.

7. The apparatus of claim 4, wherein the restraint further comprises chains extending from the flat front major surface of the mounting board to a connecting point on the flat upper major surface of the shelf.

8. The apparatus of claim 4, wherein the restraint further comprises a belt extending from the flat front major surface to a connecting point on the shelf.

9. The apparatus of claim 1, wherein the restraint further comprises a brace positionable between the lower major surface of the shelf and the flat front major surface of the mounting board.

10. The apparatus of claim 1, wherein the restraint further comprises positioning rods fitted to outer edges of the mounting board and the shelf.

11. The apparatus of claim 1, wherein the restraint further comprises chains extending from the flat major surface of the mounting board to a connecting point on the flat upper major surface of the shelf.

12. The apparatus of claim 1, wherein the restraint further comprises a belt extending from the flat front major surface of the mounting board to a connecting point on the shelf.

13. The apparatus of claim 1, further comprising braces extending from the flat back major surface to embrace an object from which the apparatus is supported.

* * * * *